No. 875,794. PATENTED JAN. 7, 1908.
J. FARLEY.
PLANTER.
APPLICATION FILED FEB. 9, 1907.
2 SHEETS—SHEET 1.
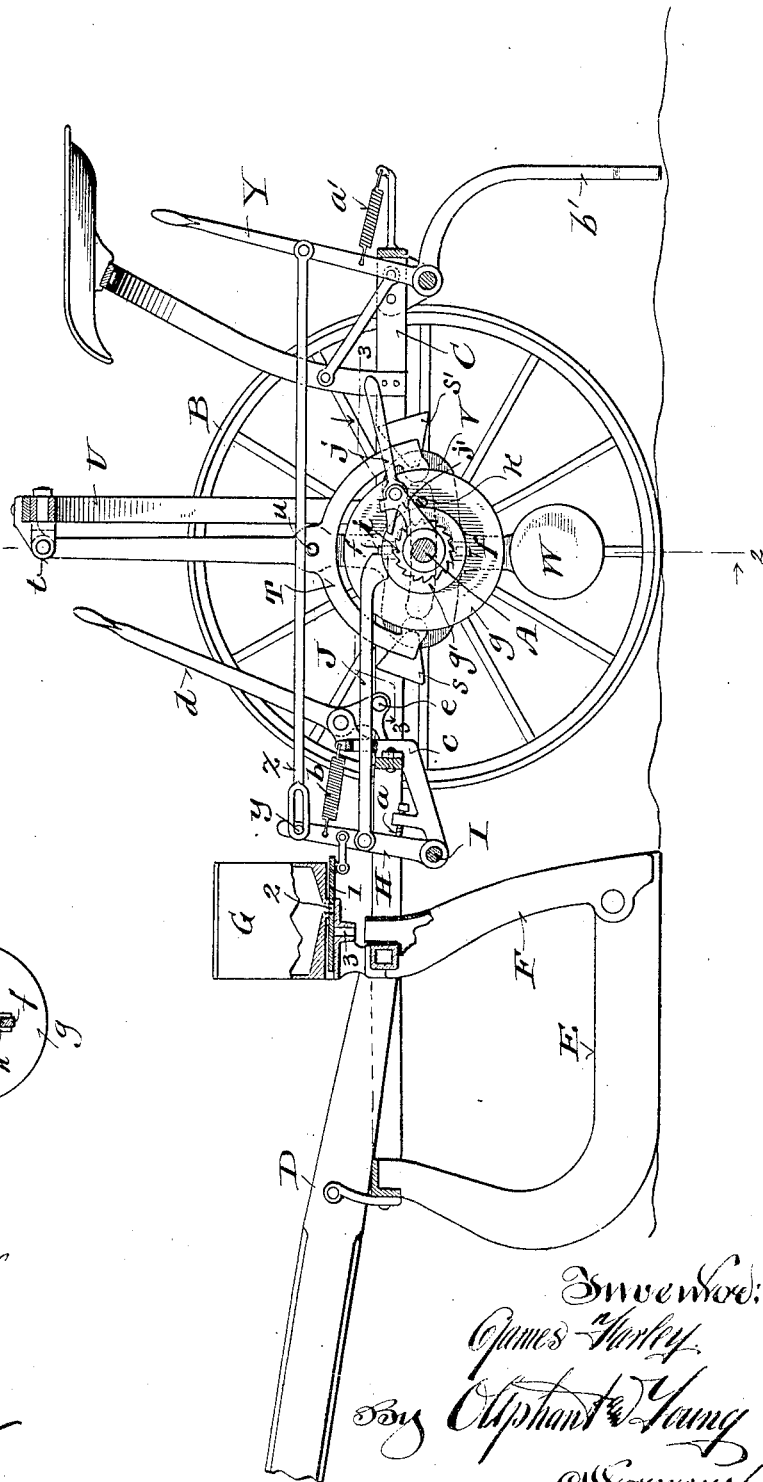

No. 875,794. PATENTED JAN. 7, 1908.
J. FARLEY.
PLANTER.
APPLICATION FILED FEB. 9, 1907.
2 SHEETS—SHEET 2.
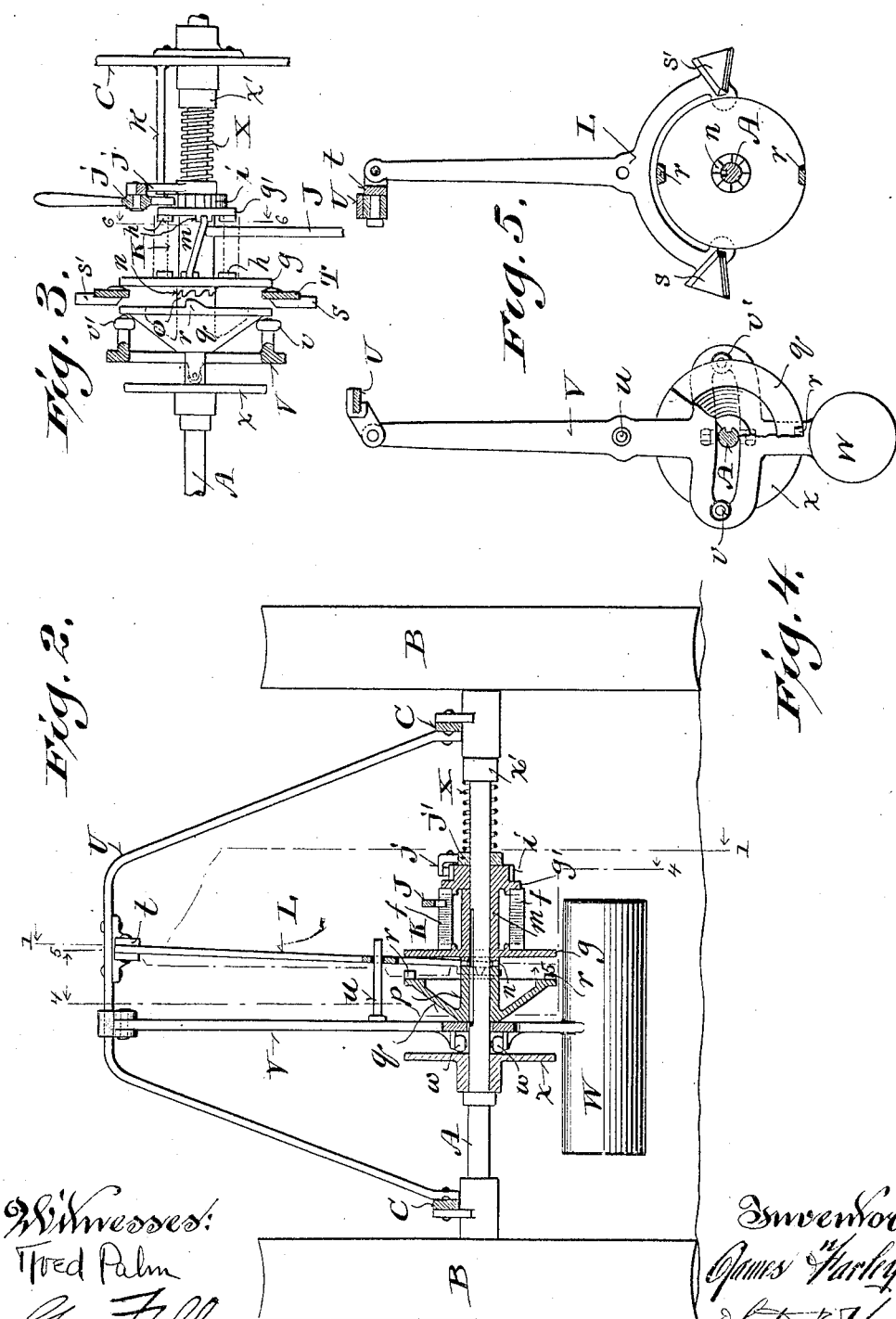

UNITED STATES PATENT OFFICE.

JAMES FARLEY, OF WAUKESHA, WISCONSIN.

PLANTER.

No. 875,794.　　　Specification of Letters Patent.　　　Patented Jan. 7, 1908.

Application filed February 9, 1907. Serial No. 356,604.

*To all whom it may concern:*

Be it known that I, JAMES FARLEY, a citizen of the United States, and resident of Waukesha, in the county of Waukesha and State of Wisconsin, have invented certain new and useful Improvements in Planters; and I do hereby declare that the following is a full, clear, and exact description thereof.

The object of my invention is to provide a simple, durable and economical planter for corn or the like, whereby the seed may be dropped in check-rows without the usual notched wire and its accompanying mechanism, provision being made for accurately checking the rows, whether the machine is planting on level or hilly ground.

Said invention therefore consists in certain novel features and peculiarities of construction as herein described and claimed with reference to the accompanying drawings.

In the drawings: Figure 1 represents a sectional elevation of a machine embodying the features of my invention, the section being indicated by line 1—1 of Fig. 2; Fig. 2, a cross-section of the same, as indicated by line 2—2 of Fig. 1; Fig. 3, a detail plan sectional view of the operating mechanism with parts broken away, the section being indicated by line 3—3 of Fig. 1; Figs. 4 and 5 are detail sectional elevations of said mechanism, as indicated by lines 4—4 and 5—5 respectively of Fig. 2, and Fig. 6, a detail sectional view on line 6—6 of Fig. 3.

Referring by letter to the drawings, A indicates the axle of a planter having secured thereto the usual traction-wheels B, the axle being supported in bearings fixed upon a frame C, which frame has secured thereto the usual draft-pole D, and seat as shown. Forward of the wheels and secured to the frame in line with said wheels, are the usual shoes or furrow openers E having conducting tubes or shanks F, over which are seed-hoppers G, each of said hoppers (only one of which is shown) in this instance being shown with a slide 1, having a seed-aperture 2 that is alternately moved to register with an opening in the bottom of the hopper and a discharge nozzle 3, whereby the seed is delivered to the shank and dropped.

A lever H that is fast on a rock-shaft I, is in link-connection with the slide 1, and imparts motion thereto by means of a thrust-dog J, that is pivoted to the lever, there being a similar short lever (not shown) upon the opposite end of rock-shaft 1 for imparting motion to the feed slide in the other hopper. The lever H is held in its rearward position, as shown, against a stop-screw $a$, by means of a coil-spring $b$, one end of which is secured to a bracket $c$ fast on the frame and the other end attached to lever H, said bracket being provided with ears in which the rock-shaft is hung, and having a lug for the support of the stop-screw. An upper projection of this bracket is slotted to form a guide for the thrust-dog and also has pivoted thereto a hand-lever $d$ having a lower arm that carries a pin $e$ projecting directly under said thrust-dog, by means of which the latter is thrown in and out of engagement with its operating mechanism. The nose or rear end of the thrust-dog rests in the path of a tappet-hub K loosely mounted upon the axle, and when the latter revolves said nose is intermittently thrust forward by oblique bars $f$ of the hub to impart forward motion to the slides 1, whereby the grain is fed at desired intervals. The hub has flanges $g, g'$, the opposite inner faces of which are provided with pockets $h$ that carry the oblique bars $f$, the said pockets being for the purpose of inserting a plurality of bars when it is desired to convert the machine from a check-row dropper to a drill; in the former instance however, as shown, only two bars are necessary, the diameter of the traction-wheels being so proportioned, that in one revolution thereof, this number of bars is sufficient to actuate the feed in order to properly space the hills of corn or other seed.

The flange $g'$ upon its outer face is reduced and carries an integral ratchet-wheel $i$, which is provided for the purpose of manually operating the tappet-hub by means of a detent $j$ that is carried by a bracket $j'$ loosely mounted upon the axle and supported when not in use, by a pin $k$ that projects from the frame of the machine. A central sleeve $m$ of the tappet-hub extends beyond the outer face of the flange $g$ thereof and terminates in a ratchet-toothed clutch-face $n$ that is engaged by a similar clutch face $o$ of a hub $p$, this hub is splined upon the axle by which it is driven, the spline also permitting lateral play thereon. The hub $p$ forms part of a conical face disk $q$, that inclines toward the flange $g$ of the tappet-hub, and has projecting from its outer edge a pair of lugs $r, r$, which lugs are provided for engagement with wedge-blocks s, s', carried by a spanner L, as best shown in Fig. 5 of the drawings. The spanner has a central arm which is pivoted between ears of a coupling t, a stud of the coupling being swiveled in a bracket secured to an arched strut U of the frame C, whereby transverse and longitudinal swing of the spanner is attained. A weighted pendulum V is also in pivotal-suspension from the strut U, the lower end of the pendulum being radially slotted to permit longitudinal play with relation to the axle A, said lower end terminating in a weight W which, by gravitation serves to hold the pendulum perpendicular at all times. The pendulum has a pin u, which engages an aperture in the arm of the spanner, and anti-friction rollers v, v', that contact with the extreme outer conical face of the disk q equidistant from the axle when the machine is traveling upon the level, there being other centrally located anti-friction rollers w upon the opposite side of the pendulum arranged to oppose a plate x, which is loosely mounted upon the axle, and held in position by a collar secured to said axle. Interposed between a collar x' on the axle A and the bracket j' of detent j is a coil-spring X, the tension of which exerts a pressure to hold the several members of the feed-mechanism carried by said axle in their normal position, as shown in the drawings.

The upper end of lever H, which actuates the feed-slides, is provided with a pin y that engages the slotted end of a rod z, which rod is connected to a hand-lever Y that is secured to a rock-shaft mounted in bearings depending from the rear portion of the machine-frame, the hand-lever being held rearward by a coil-spring a', as shown. Fast to the rock-shaft and extending downward therefrom are a pair of marker-arms b', (only one being shown) which arms are in line with the shoes and traction-wheels. These arms terminate slightly below the ground-line, and when the lever H is actuated to feed a hill of grain said arms, by their connection therewith, will lift suddenly and thus visibly mark the position of the last hill dropped, the distance between the shoe-shank and markers being the distance between hills of dropped grain.

The hand-lever Y is employed to raise the markers when the machine is not operating or while turning for a new row, the slot in the rod z permitting this movement independent of the feed-lever action.

In the operation of my machine, with each revolution of the traction-wheels, the tappet-bars f will cause the thrust-dog to reciprocate and thereby feed two hills of grain, the marker-arms in the meantime registering said hills so as to be visible. When turning preparatory to sowing another row, the driver before starting adjusts the machine so that the last hill of the markers are alined with the previous row, the detent j may then be operated to rotate the tappet-hub until the same has actuated the thrust-dog and dropped one hill of grain, at which time the machine is started and will thereafter automatically drop the grain in regular checks parallel with the last row. Should the machine strike a rise in the field it is understood that owing to the arc described thereby, it would travel over a greater number of feet in reaching a point where the ground was level, than if said machine were traveling upon a horizontal plane, consequently the rows would soon become twisted and alinement with those upon the level ground would be imperfect. The pendulum-apparatus as previously described is provided to arrest this result and operates as follows: When the front of the machine is tilted upward in ascending an incline the pendulum will swing rearward, this action causes the forward anti-friction roller w to force the disk q together with the tappet-hub longitudinally of the axle, thereby presenting a point of one of the bars f to the thrust-dog, which, owing to its oblique angle, is slightly further away from said dog, causing the contact of the same to be delayed which will thus increase the distance between the dropping of the next hill of grain. Thereafter as the machine ascends the incline, the distance is proportionately increased by the spanner, which co-acts with the pendulum, its wedge-block s being brought into the path of travel of the lugs r, the engagement of which lugs and block disconnects the clutch-faces of the tappet and disk-hubs, resulting in a delay of said tappet-hub while the said clutch is disconnected, serving to lengthen the time and distance between intervals of tripping the feed in proportion to the pitch of ground. It is understood that the greater the pitch, the longer the delay between intervals of dropping the seed owing to the tapered wedge-blocks, which at their widest face will necessarily hold the clutch-members disconnected at longer intervals and vice versa, the position of said blocks being controlled by the gravity-pendulum. The plate x with the anti-friction rollers w serve as a backing for the pendulum, when the latter is acting to force the conical-disk out of its normal position against the tension of spring X, said construction being desirable in order to reduce the friction of the parts to a minimum.

While I have shown and described the tappet-hub as having oblique bars f, it is obvious that the same, in some instances, may be straight, and I may without departure from the spirit of my invention utilize the spanner as a weighted pendulum, in which case the wedge-blocks would act to disengage the clutch-members as described, it being within the scope of my invention to vary the construction of the tappet-hub provided the essential feature, namely the gravity-controlled pendulum and clutch-members co-acting therewith are retained.

I claim:

1. A planter comprising a frame, an axle carried thereby, traction-wheels secured to the axle, a feed-hopper, feed-mechanism for the hopper, a thrust-dog in connection with the feed-mechanism, a tappet-hub loosely mounted on the axle in the path of the thrust-dog, a clutch-member carried by the tappet-hub, a clutch-disk secured to the planter-axle, constituting a clutch-member for engagement with the clutch-member of the hub, and a spring for holding the said clutch-members together, the combination of lugs carried by one of the aforesaid clutch-members, a swinging spanner, blocks carried by the spanner, and a gravity-controlled weight in connection with the spanner for controlling the position of the blocks with relation to the lugs.

2. A planter comprising a frame having an overhead supporting strut, an axle carried thereby, traction-wheels secured to the axle, a feed-hopper, feed-mechanism for the hopper, a thrust-dog in connection with the feed-mechanism, a clutch-membered tappet-hub loosely mounted on the planter-axle in the path of the thrust-dog, and another clutch-member secured to said axle for engagement with the tappet-hub clutch-member, the combination of a weighted pendulum, and wedge-blocks for engagement with the aforesaid clutch-members, said wedge-blocks being controlled by the pendulum.

3. A planter comprising a frame having an overhead support, an axle carried by the frame, traction-wheels secured to the axle, a feed-hopper, feed-mechanism for the hopper, a rock-shaft in connection with the feed-mechanism, a thrust-dog in connection with the rock-shaft, a clutch-face on said tappet-hub, a clutch-disk in spline-connection with the axle, a spring for holding the clutch-members in engagement, lugs on the clutch-disk, a spanner pivoted to the overhead support of the planter-frame, wedge-blocks carried by the spanner adapted to engage the lugs of the clutch-disk, a gravity-controlled weight in connection with the spanner, pivoted marker-arms carried by the planter-frame, and a rod in connection with the marker-arms and the aforesaid rock-shaft.

4. A planter comprising a frame having an upper supporting-strut, an axle carried by the frame, traction-wheels secured to the axle, a feed-hopper, feed-mechanism for the hopper, a rock-shaft, a spring-controlled lever secured thereto and connected to the feed-mechanism, a tappet-hub loosely mounted on said axle, a thrust-dog secured to the lever, the end of which is in the path of the tappet-hub, marker-arms pivoted to the frame, a rod connecting the marker-arms and said lever, a clutch-member on the tappet-hub, an incline face clutch-disk secured to the aforesaid axle for engagement with the clutch-member of said tappet-hub, lugs on the clutch-disk, a spanner pivoted to the upper supporting-strut of the frame, wedge-blocks carried by the spanner adapted to engage the lugs, a weighted pendulum pivoted to said supporting-strut, adapted to engage the inclined face of the clutch disk, and means connecting the pendulum and spanner.

In testimony that I claim the foregoing I have hereunto set my hand at Milwaukee, in the county of Milwaukee and State of Wisconsin in the presence of two witnesses.

JAMES FARLEY.

Witnesses:
GEO. W. YOUNG,
FRED PALM.